United States Patent
Tanaka et al.

(10) Patent No.: US 7,280,306 B2
(45) Date of Patent: Oct. 9, 2007

(54) SERVO TRACK WRITE AT LOW PRESSURE USING PRESSURE INSENSITIVE AIR BEARING SURFACE

(75) Inventors: Hidetsugu Tanaka, Kanagawa (JP); Tsuyoshi Matsumoto, Kanagawa (JP); Atsushi Tatsugawa, Kanagawa (JP); Tatsushi Aoki, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 72 days.

(21) Appl. No.: 11/339,861

(22) Filed: Jan. 25, 2006

(65) Prior Publication Data

US 2006/0164752 A1    Jul. 27, 2006

(30) Foreign Application Priority Data

Jan. 26, 2005   (JP)   ............................. 2005-017859

(51) Int. Cl.
*G11B 21/02*   (2006.01)
(52) U.S. Cl. ...................................................... 360/75
(58) Field of Classification Search ................ 360/75, 360/78.04, 77.02, 244.2, 69
See application file for complete search history.

(56) References Cited

U.S. PATENT DOCUMENTS

| 3,789,666 A * | 2/1974 | Favre ........................... 73/702 |
| 5,825,581 A * | 10/1998 | Morita et al. ............. 360/78.04 |
| 2003/0081344 A1 | 5/2003 | Fioravati et al. |
| 2005/0275971 A1 * | 12/2005 | Kuroki et al. ........... 360/244.2 |

* cited by examiner

*Primary Examiner*—Fred F. Tzeng
(74) *Attorney, Agent, or Firm*—Townsend and Townsend and Crew LLP; John Henkhaus

(57) ABSTRACT

Embodiments of the invention provide a manufacturing method for a disk drive which allows highly accurate recording of servo data without substituting the internal gas of the disk drive, and such a magnetic disk drive and servo track writer. In one embodiment, a disk, a magnetic head slider with a head for writing data onto and reading out data from the disk, a suspension for retaining the magnetic head slider, an arm for supporting the suspension, and a driving section for driving the arm are stored into an enclosure. When a servo track write operation is conducted, the enclosure interior is depressurized to an atmospheric pressure lower than normal pressure and then servo data is recorded on the disk.

14 Claims, 8 Drawing Sheets

Fig.1
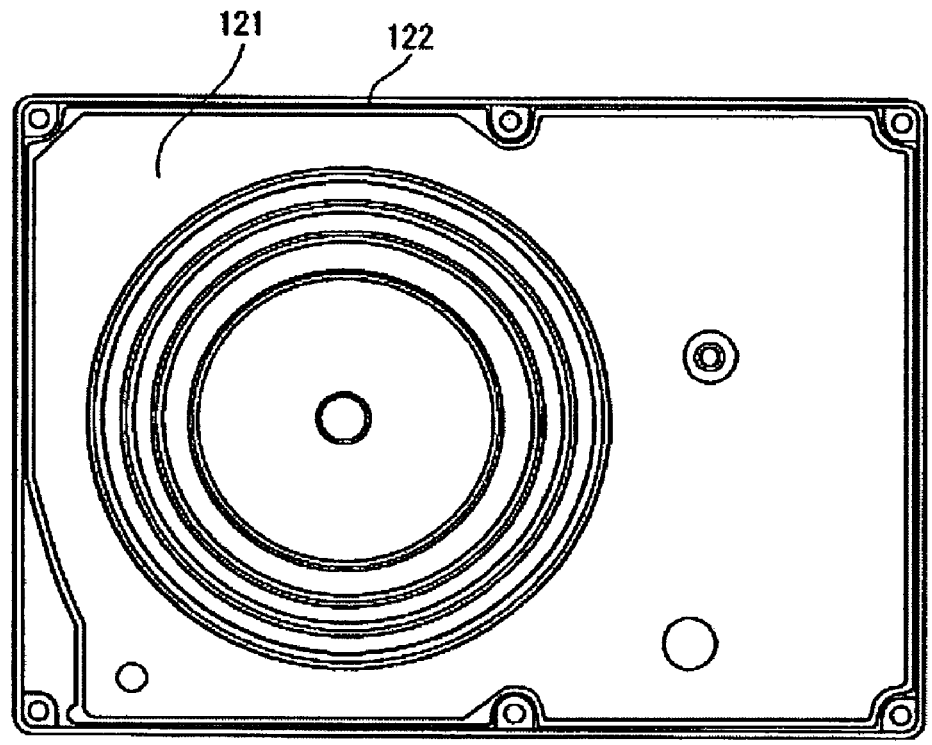
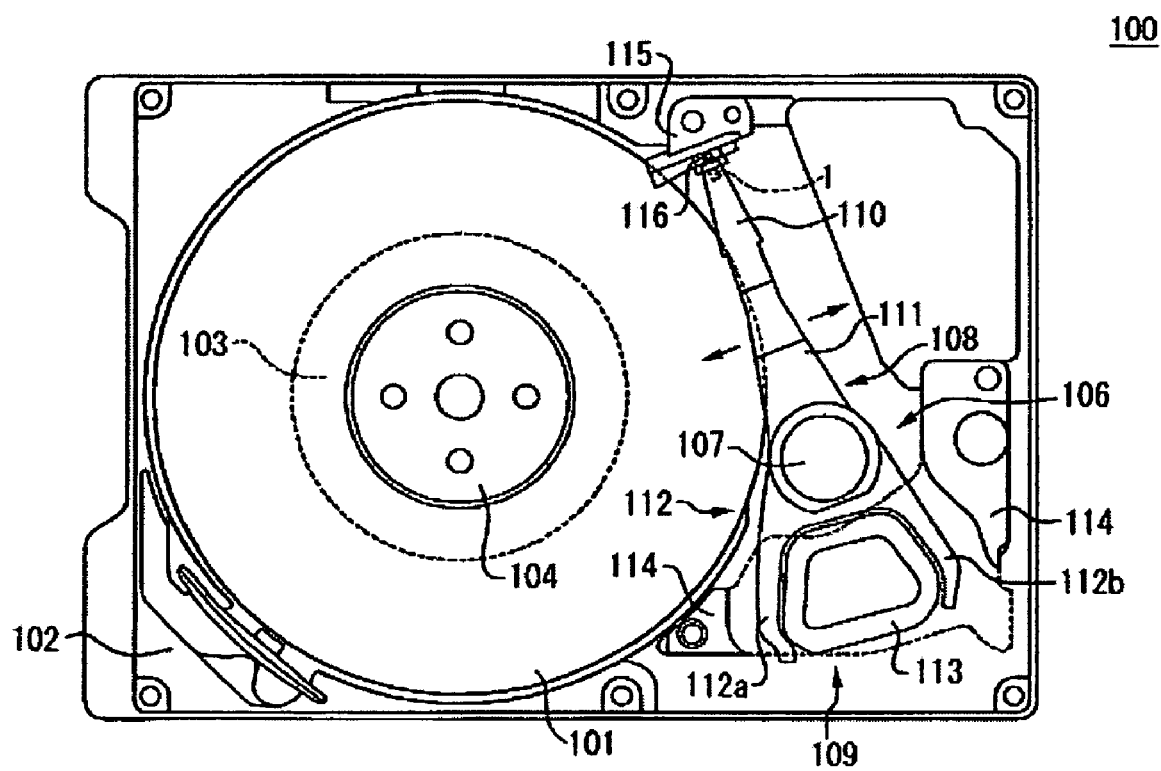

SERVO TRACK WRITE AT LOW PRESSURE USING PRESSURE INSENSITIVE AIR BEARING SURFACE

CROSS-REFERENCES TO RELATED APPLICATIONS

This application claims priority from Japanese Patent Application No. JP2005-017859, filed Jan. 26, 2005, the entire disclosure of which is incorporated herein by reference.

BACKGROUND OF THE INVENTION

The present invention relates to a servo track writer capable of recording servo data accurately, a magnetic disk drive, and a manufacturing method for magnetic disk drives.

The devices that use various forms of media, such as an optical disk and a magnetic tape, are known as data storage devices. Among these devices, hard-disk drives (HDDs) are most commonly used as the storage devices of computers, and the HDDs are one type of storage device indispensable in current computer systems. Additionally, the excellent characteristics of the HDDs are increasingly expanding their applications not only in computers, but also as the removable memories and similar devices used in dynamic-image recording/reproducing devices, car navigation systems, digital cameras, or the like.

The magnetic disks used in an HDD each have a plurality of concentrically formed tracks, and each track has a data region into which user data will be stored, and a servo region into which address information (servo data) will be stored. The magnetic head formed of a thin-film element can read or write data by accessing a desired region (address) in accordance with address information.

A cylinder ID, a servo sector number, a burst pattern, and the like are stored as servo data in the servo region. Track IDs identify the addresses of tracks, and servo sector IDs identify the addresses of servo sectors. The burst pattern contains information on the relative positions of the magnetic head with respect to tracks. The burst pattern that is an array of regions formed at fixed intervals in the radial direction of the disk, each region having signals stored therein, is constituted by multiple banks of signal storage regions different from one another in terms of phase.

Data is read out from or written onto the magnetic disk while the position of the magnetic head is being confirmed against servo data in a rotating condition of the magnetic disk. Servo data that has been read by the magnetic head undergoes arithmetic processing by a controller. The value of the electric current to be supplied to a voice coil motor (VCM) is determined from the relationship between the current position and desired position of the magnetic head. The controller generates control data (DACOUT) that indicates the above-calculated electric current value, and supplies the data to a VCM driver. If a shift in position occurs, the controller drives a carriage so as to compensate for the shift, and conducts position control of the magnetic head.

HDDs tend to have a narrower track spacing for higher track density in order to meet the recent needs of higher capacity. To obtain narrower tracks, the above-mentioned servo data for controlling the positioning of the head needs to be recorded more precisely, and in this sense, the servo track write (STW) process for writing the servo data becomes a very important production process. Efforts are therefore being made to improve positioning accuracy by, for example, using the encoder of a more accurate optical system or recording only the disk in an external STW process. However, the improvement has not yet been achieved since air disturbance due to disk rotation or the fluttering of the disk itself becomes the governing factor in the accuracy of the servo track write operation.

Patent Document 1 (U.S. Patent Application Publication No. 2003/0081344) discloses a servo track writer that performs the servo track write operation in a room placed under a low-density gas atmosphere. In the technology described in Patent Document 1, STW is executed by inserting into a servo track writer the disk drive into which servo data is to be written, and substituting a low-density gas (such as a helium gas) for the internal atmosphere of a room in which the servo track writer is to be placed. Vibration of the disk in the STW process is reduced by executing STW in the low-density gas atmosphere.

In the servo track writer described in above Patent Document 1, however, since a helium gas is used in STW, manufacturing processes become complex and troublesome and manufacturing costs increase. It is desirable to improve servo track write accuracy by reducing disk vibration in the STW process without substituting the disk drive interior by a gas different from air, such as a helium gas.

BRIEF SUMMARY OF THE INVENTION

The present invention was made in view of these situations, and a feature of the invention is to provide a manufacturing method for a disk drive which allows highly accurate recording of servo data without substituting the internal gas of the disk drive; and such a magnetic disk drive and servo track writer.

A method of manufacturing a disk drive according to an aspect of the present invention includes: storing into an enclosure, a disk, a magnetic head slider with a magnetic head for writing data onto and reading out data from the disk, a suspension for retaining the magnetic head slider, an arm for supporting the suspension, and a driving section for driving the arm; depressurizing the inside of the enclosure to an atmospheric pressure lower than normal pressure; and recording servo data on the disk.

In the present invention, since the depressurization of the enclosure interior is followed by servo data recording, the servo data can be recorded under a situation almost free from the effects of air disturbance due to disk rotation.

Also, the enclosure interior can be depressurized to an atmospheric pressure lower than normal pressure, by housing the enclosure in a chamber depressurized to an atmospheric pressure lower than normal pressure. This means that the use of the chamber allows depressurization to a desired pressure.

Additionally, the enclosure interior can be depressurized to an atmospheric pressure lower than normal pressure, by suctioning the internal gas from the particle test hole provided in the enclosure. That is to say, the enclosure interior can be depressurized using a simple, convenient method.

The magnetic head slider has an air-bearing surface that includes: a leading side air-bearing surface formed in a longitudinal direction of the slider from a leading edge; a first stepped surface formed on the leading side air-bearing surface, the first stepped surface having a first shoulder with respect to the leading side air-bearing surface; and a second stepped surface formed on the first stepped surface, the second stepped surface having a second shoulder with respect to the first stepped surface. Thus, the magnetic head slider makes servo data recording on the disk possible, and the two shoulders of the magnetic head slider make it possible to minimize decreases in slider-to-disk clearance under reduced pressure.

Furthermore, the magnetic head slider has an air-bearing surface that includes: one or plural leading rail surfaces; a trailing rail surface with approximately the same height as that of each of the leading rail surfaces, the trailing rail surface having the magnetic head provided thereon; a leading side air-bearing surface having a required depth of D1 with respect to each leading rail surface and to the trailing rail surface; a negative-pressure grooved surface with an even greater depth of D2 with respect to the leading side air-bearing surface; and a stepped upper surface having continuity in a direction from the leading edge toward a trailing edge, the stepped upper surface being formed in a region including at least one portion of each of the leading rail surfaces, with a required height above each thereof. The leading side air-bearing surface and each of said leading rail surfaces are formed between said leading edge and said stepped upper surface. Thus, the magnetic head slider makes servo data recording on the disk possible, and the stepped upper surface formed on the leading rail surface makes it possible to minimize decreases in slider-to-disk clearance under reduced pressure.

A servo track writer according to the present invention includes a magnetic head slider with a magnetic transducer for recording servo data on a disk, a suspension that retains the magnetic head slider, an arm that supports the suspension, and a driving section that drives the arm. The magnetic head slider in this servo track writer operates so that a difference between a slider-to-disk clearance under a state depressurized to a required pressure lower than normal pressure, and a slider-to-disk clearance under normal pressure, is less than 10% of the slider-to-disk clearance under normal pressure.

In the present invention, the servo track writer has a magnetic head slider whose changes in slider-to-disk clearance under a state depressurized to a required pressure, from the slider-to-disk clearance under normal pressure, are controlled to below about 10% of the slider-to-disk clearance under normal pressure. Since the slider is thus almost free from changes in slider-to-disk clearance due to changes in atmospheric pressure, servo track writing under depressurized states becomes possible.

Moreover, the magnetic head slider is adapted so that the slider-to-disk clearance under the state depressurized to the required pressure is reduced by 0.5 nm or more with respect to the slider-to-disk clearance under normal pressure. A head crash during depressurization, therefore, can be effectively prevented since changes in the slider-to-disk clearance of the magnetic head slider under the state depressurized to the required pressure, with respect to the slider-to-disk clearance under normal pressure, are controlled to below about 0.5 nm or less.

A magnetic disk drive according to the present invention includes a disk, a magnetic head slider with a magnetic transducer for recording servo data on the disk, a suspension that retains the magnetic head slider, an arm that supports the suspension, and a driving section that drives the arm. The magnetic head slider in this magnetic disk drive operates so that a difference between a slider-to-disk clearance during self-servo track writing under a state depressurized to a required pressure lower than normal pressure, and a slider-to-disk clearance under normal pressure, is about 10% or less of the slider-to-disk clearance under normal pressure.

In the present invention, the magnetic disk drive has a magnetic head slider whose changes in slider-to-disk clearance under a depressurized state from the slider-to-disk clearance under normal pressure are controlled to below about 10% of the slider-to-disk clearance under normal pressure. This allows self-servo track writing in an internally depressurized state of an enclosure, and thus allows highly accurate recording of servo data with disk fluttering being suppressed.

According to the present invention, it is possible to provide a manufacturing method for a disk drive which allows highly accurate recording of servo data without substituting the internal gas of the disk drive; and such a magnetic disk drive and servo track writer.

BRIEF DESCRIPTION OF THE DRAWINGS

FIG. 1 is a plan view showing a schematic configuration of an HDD according to an embodiment of the present invention.

DETAILED DESCRIPTION OF THE INVENTION

Figure 2:
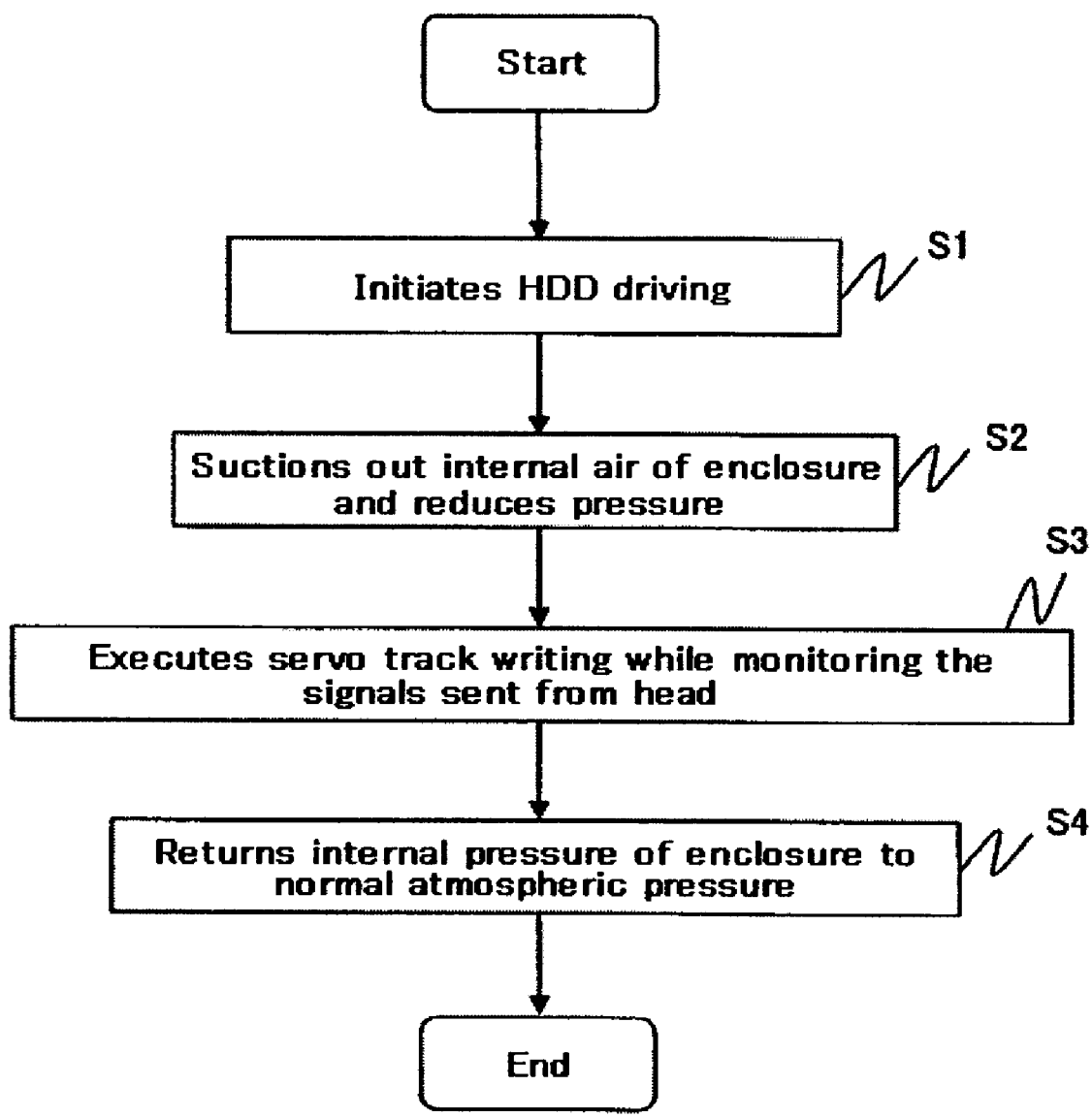
FIG. 2 is a flowchart showing a self-servo track writing method according to the above embodiment of the present invention.

The mode of embodiment that applies the present invention is described in detail below with reference to the accompanying drawings. The present embodiment is intended to record servo data with high accuracy by conducting a servo track write (STW) operation under reduced pressure. Depressurizing the inside of a hard-disk drive (HDD) during the STW operation eliminates any effects of air (airflow) as effectively as, or more effectively than, under an atmosphere filled with a low-density gas such as a helium gas. The STW operation can therefore be conducted very accurately.

In recent years, track recording density has been increased for improved disk recording density, and coupled with the increase in track recording density, improvements in data transfer rate have been performed for higher HDD performance. An increase in data transfer rate leads to an increase in a rotating speed of a spindle motor and results in a medium being displaced in a vertical or horizontal direction dependently on a natural frequency of the medium. This event is called "track misregistration (TMR)." Significant TMR makes positioning control of a head difficult, thus making it difficult to increase the track recording density.

The HDD conducts head positioning control with a servo signal that the HDD has used to read out servo data from the disk. To reduce TMR, therefore, it is important to record very precisely the servo data used for positioning control of a head. The servo data allows a positioning error to be measured using a position error signal (PES), one type of servo signal. The track recording density has its upper limit determined by a magnitude of the positioning error. This means that too large a positioning error does not make it possible to increase the track recording density, and thus that to obtain a desired track recording density, the positioning error must be controlled to stay within a required range.

In the present embodiment, therefore, fluttering of the disk, associated with rotation thereof, is suppressed and servo data recorded very precisely, by conducting the servo track operation under a pressure lower than normal pressure (i.e., under a depressurized state) in order for the positioning error to stay within the required range.

First, an example of the HDD is described below. FIG. 1 is a plan view showing a schematic configuration of an HDD 100 according to the present embodiment. Reference number 101 in FIG. 1 denotes a disk recording medium on which data will be recorded. The disk recording medium 101 is a nonvolatile magnetic disk whose magnetic layers are magnetized to store the data. Reference number 102 denotes a base 102 on which various constituent elements of the HDD 100 are mounted. The base 102 constitutes a disk enclosure by being fixed via the cover 121 and gasket 122 that fill in an upper opening of the base 102, and can thus accommodate each constituent element of the HDD 100 in an enclosed condition.

Reference number 103 denotes a spindle motor, and 104 a hub provided therein. Reference number 1 denotes a magnetic head slider having a magnetic transducer (not shown) by which the data input to/output from a host (not shown) will be written onto and/or read out from the disk recording medium 101. The magnetic head slider 1 is a slider on which is formed the magnetic transducer constructed of a writing element which converts an electrical signal into strength of a magnetic field according to the data stored onto the disk recording medium 101, and/or a reading element which converts strength of the magnetic field applied from the disk recording medium 101 into an electrical signal.

Reference number 106 denotes an actuator that retains and moves the magnetic head slider 1. The actuator 106 is pivotably held in place by a pivot 107, and has an actuator arm 108 and a voice coil motor (VCM) 109 functioning as a driver. The actuator arm 108 has, as its constituent elements, a suspension 110, a head arm 111, and a coil support 112, and these elements are connected in that order from a leading end (of the actuator arm 108) at which the magnetic head slider 1 is disposed.

Reference number 113 denotes a flat coil, and 114 an upper stator magnet hold plate fixed to the base 102. The upper stator magnet hold plate 114 has its main section shown in a notched condition for convenience's sake, with a profile depicted as a broken line. A lower stator magnet hold plate, although not shown, is disposed under the flat coil 113 in such a manner that the flat coil 113 is sandwiched between the upper stator magnet hold plate 114 and the lower stator magnet hold plate. The VCM 109 has the flat coil 113, a stator magnet (not shown) fixed to the upper stator magnet hold plate 114, and a stator magnet (not shown) fixed to the lower stator magnet hold plate. Reference number 115 denotes a ramp mechanism for unloading the magnetic head slider 1 from above the disk recording medium 101 when rotation thereof comes to a stop. Reference number 116 denotes a tab formed at a front end of the suspension 110. The actuator 106 of the present embodiment is also applicable to a CSS (Contact Start and Stop) scheme in which, when the magnetic transducer of the magnetic head slider 1 does not read/write data, the magnetic head slider 1 is unloaded onto a zone disposed on an inner circumference of the disk recording medium 101.

The disk recording medium 101 is integrally held by the hub 104 of the spindle motor 103 fixed to the bottom of the base 102, and is driven by the spindle motor 103 to rotate at a speed of 10,000 rpm, for example. When the HDD 100 is in a non-operating condition, the disk recording medium 101 is at rest. Coil support arms 112a, 112b are formed on the coil support 112 pivotably held by the pivot 107. The coil support arms 112a, 112b hold the flat coil 113 at the opposite side of the head arm 111 with respect to the pivot 107. The VCM 109 pivots the actuator arm 108 around the pivot 107 in response to a driving signal supplied from a controller (not shown) to the flat coil 113. Thus, the VCM 109 can cause the magnetic head slider 1 to move above along the surface of the disk recording medium 101 or to move out from above the disk recording medium 101.

In order to read data from/write data onto the disk recording medium 101, the actuator 106 causes the magnetic head slider 1 to move above a data region provided on the surface of the rotating disk recording medium 101. Pivoting of the actuator 106 moves the magnetic head slider 1 in a radial direction of the disk recording medium 101, along the surface thereof. This makes it possible for the magnetic head slider 1 to access a desired track. The slider 1 flies with a fixed gap above the disk recording medium 101 when a pressure generated by viscosity of air present between the rotating disk recording medium 101 and the air-bearing surface (ABS) of the magnetic head slider 1 that faces the disk recording medium 101 balances the pressure applied in a direction thereof by the suspension 110.

Stoppage of the rotation of the disk recording medium 101 brings the magnetic head slider 1 into contact with the surface of the disk recording medium 101, resulting in an adsorption phenomenon that causes problems such as data region damage and a disk recording medium rotating failure. Before the rotation of the disk recording medium 101 is stopped, therefore, the actuator 106 unloads the magnetic head slider 1 from the data region onto the ramp mechanism 115. The actuator 106 pivots in a direction of the ramp mechanism 115, then the tab 116 at the front end of the actuator slides along the surface of the ramp mechanism 115, and the tab gets on a parking surface of the ramp mechanism 115. The magnetic head slider 1 is thus unloaded. For loading, the actuator 106 that has been supported on the parking surface departs from the ramp mechanism 115 and moves above the surface of the disk recording medium 101.

The disk recording medium 101 in this example is constituted by one or plural media, and may employ either single-sided or double-sided recording. For double-sided storage, an appropriate number of suspensions each for retaining an associated head when the head scans a storage surface are provided according to the number of recording surfaces. In this case, one suspension is secured to the coil support 112 via the head arm, at the position where the suspension overlaps another suspension with a required spacing therefrom with respect to one disk recording medium 101. For double-sided storage onto plural disk recording media, each of these media is integrally held by the hub 104 at fixed intervals in a direction of a rotational axis of the spindle motor 103. An appropriate number of suspensions each for retaining an associated head when the head scans a storage surface are provided according to the number of recording surfaces, and one suspension is secured to the coil support 112 via the head arm, at the position where the suspension overlaps the suspension of FIG. 1 with a required spacing from this suspension.

Next, a servo track writing method in the present embodiment is described below. Servo track writing may use a servo track writer or a self-servo track write scheme in which the HDD 100 itself records servo data. That is to say, if servo track writing is conducted in a depressurized state, servo data recording accuracy can likewise be improved. Hereunder, a method of self-servo track writing is described.

FIG. 2 is a flowchart showing the self-servo track writing method according to the present embodiment. As shown in FIG. 2, the HDD is first started up (LOAD HEAD) in step S1. Prior to the startup, signals from the magnetic head are checked to prevent contact between the magnetic head and the disk. Next, internal air of the HDD enclosure is suctioned out to reduce pressure in step S2. For example, for a 3.5-inch HDD or an HDD whose enclosure is relatively high in strength, using a vacuum pump allows internal air of the HDD enclosure to be suctioned out from the particle holes provided in the HDD. Alternatively, internal pressure of the HDD enclosure can be reduced by inserting the HDD into a depressurizable chamber and reducing an internal pressure thereof. Using the chamber makes it possible to reduce the load applied to the enclosure, and is suitable particularly in a compact HDD such as a 2.5-inch one.

After the pressure has been reduced to a desired value, outputs from the magnetic head are monitored in terms of, for example, magnitude (amplitude), resistance, and acoustic emission level. While no contact between the magnetic head and the disk is being confirmed in this way, servo data is recorded in step S3. Finally, the inside of the HDD enclosure is returned to normal pressure in step S4 to complete the servo track write operation. In this manner, the HDD 100 is manufactured by undergoing a normal assembly process, servo data recording under the reduced pressure, and a required inspection process, in that order.

As described above, positioning control of the head is accomplished by reading out servo data using the head, then generating from a readout signal the position error signal (PES) that indicates how far the head is from a center line of the closest track, and controlling the actuator on the basis of PES.

It is known, however, that as track density is enhanced by increases in recording density, so-called disk runout indicative of a relative deflection between the head and the disk medium deteriorates positioning accuracy of the head and makes it difficult to maintain the head accurately above the center line of a desired track. The disk runout is divided into primary runout (the repeatable runout, or RRO, that repeatedly appears in synchronization with the rotation of the spindle motor rotationally driving the disk) and the non-repeatable runout, or NRRO, that does not synchronize with the rotation. Both types of disk runout slides the head out from the center line of the track during track following, whereby the signal level of position error signal PES is increased.

Such a runout error results from air drag (air loss) due to disk rotation. Accordingly, processing based on position error signal PES, for example, for reducing any effects of the air loss (or the like) due to the rotation of the disk (or the like), is provided to ensure normal track following when user data is written onto or read out from the disk. Providing such processing, however, makes it necessary to generate a correction signal from servo data by use of an HDC/MPU or the like, and then to control the VCM 109 and/or other elements in accordance with the correction signal. Processing consequently becomes troublesome.

Air loss due to disk rotation also causes a similar problem during servo data recording, thus making highly accurate recording of the servo data difficult. In the present embodiment, however, servo data can be recorded on the disk very accurately by performing the servo track write operation after conducting depressurization for minimum effects of the airflow that causes a runout error. At this time, when servo data is recorded, a certain degree of depressurization is required and it is thus necessary that under a depressurized state, the magnetic head slider be capable of maintaining a stable clearance between the disk and the magnetic head.

Figure 3:
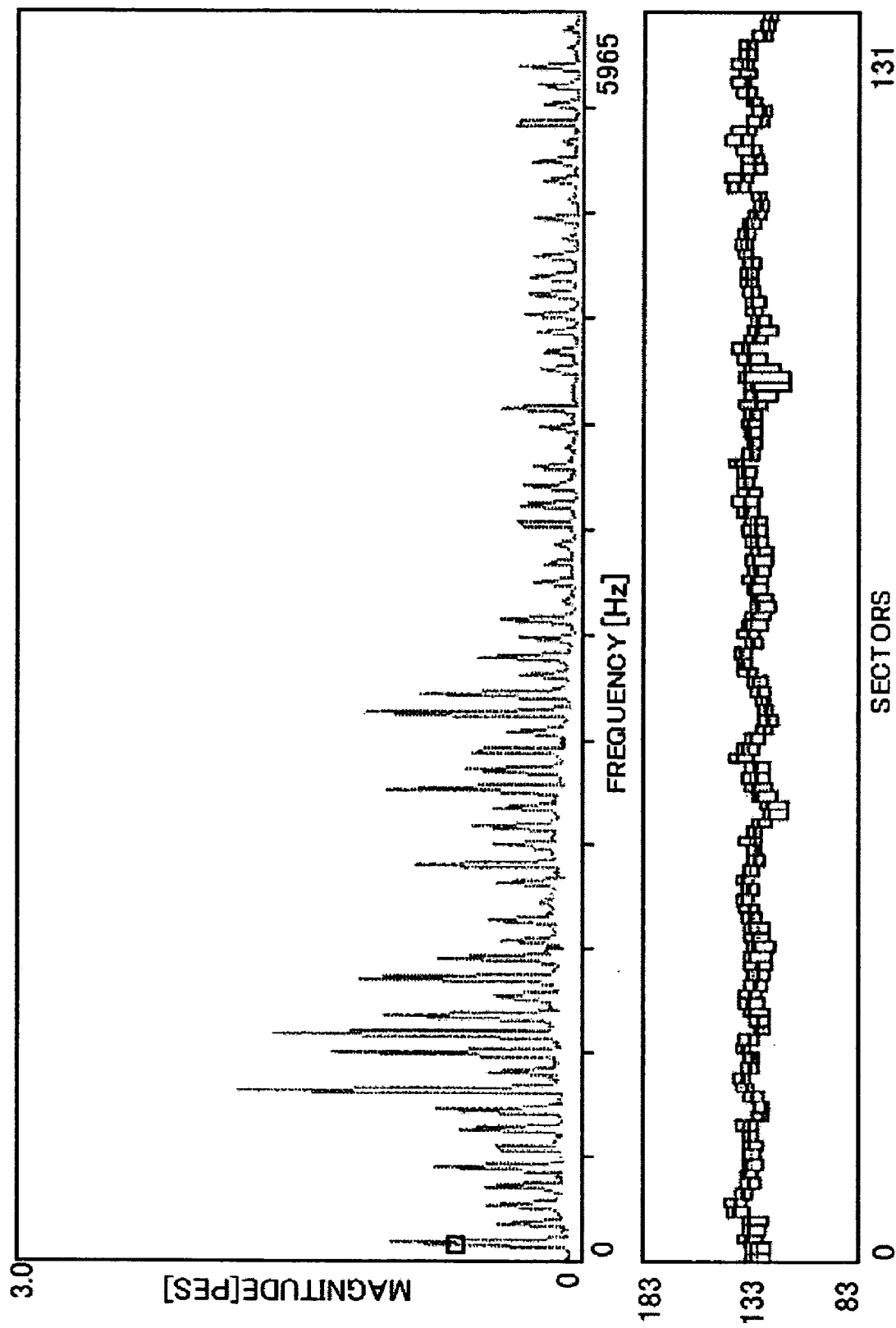
FIG. 3 is a diagram showing an advantageous effect of the present invention, the diagram graphically showing the PES obtained from the servo data recorded under a depressurized state.
Figure 4:
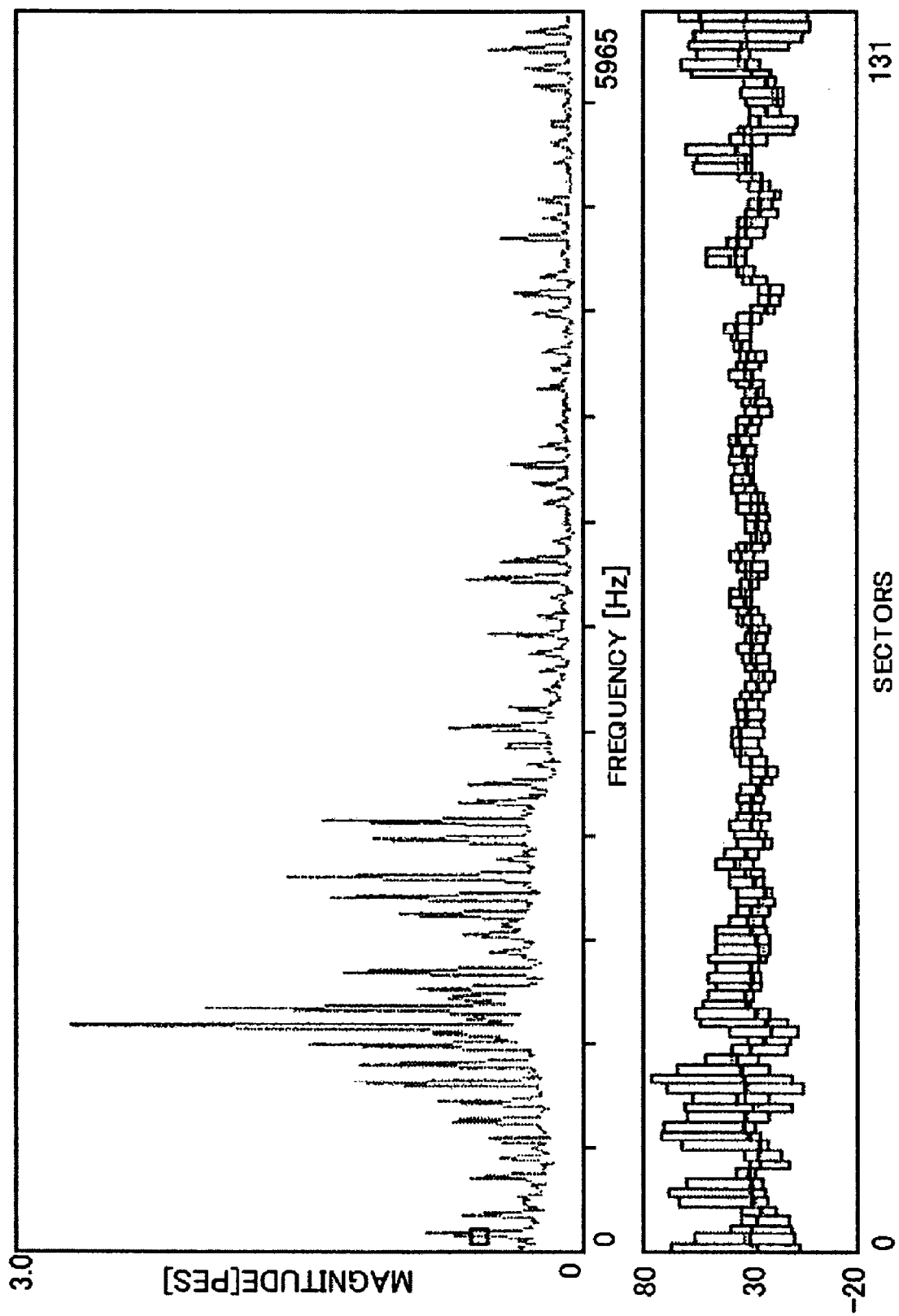
FIG. 4 is a graph showing the PES obtained from the servo data recorded using a conventional method.

Advantageous effects of the present embodiment are described next. FIG. 3 shows the PES obtained from the servo data recorded under such depressurized state as described above. More specifically, FIG. 3 shows the positioning accuracy level achieved during servo track writing at an atmospheric pressure of 0.4. FIG. 4 shows, for comparison, results of servo track writing under normal pressure in the same drive.

Upper graphs in FIGS. 3 and 4 represent amplitude (PES)-frequency relationships of servo data output signals, with a horizontal axis denoting the frequency and a vertical axis denoting a level of PES. Lower graphs represent relationships between PES and the number of sectors per track, with a horizontal axis denoting the number of sectors and a vertical axis denoting a level of PES. In each graph, PES denotes a unit of a distance with 1 being taken as the PES level achieved when a width of one track is set as $1/256$.

Servo data of cylinder 0 was measured 20 times at a rotating speed of 5,400 rpm of a 3.5-inch HDD, and measurement results were averaged. It can be seen from FIG. 3 that when servo track writing is executed under a reduced atmospheric pressure of 0.4, the PES level can be reduced by 1.93 on the average, which indicates that servo data is recorded with very high accuracy.

As detailed above, servo data can be recorded very accurately by executing servo track writing under depressurized states. In general, however, a clearance of the magnetic head slider from the disk decreases as pressure is reduced and as the disk speed is lowered. Recording servo data under reduced pressure, therefore, reduces the disk-to-head clearance, and this may bring the head into contact with the disk surface, resulting in a head crash and/or other problems. For this reason, a pressure level to which the disk interior is to be depressurized for servo track writing is not limited to the above-mentioned atmospheric pressure of 0.4 and may be an atmospheric pressure of about 0.6, for example. In other words, an appropriate pressure, according to a particular rotating speed of the HDD and a change in the disk-to-head clearance detailed later, needs to be set so that a positioning error stays within the range required for desired track recording density to be attained.

Accordingly, in the present embodiment, changes in disk-to-head clearance are suppressed, even under reduced pressure, by adopting a magnetic head slider whose disk-to-head clearance is insensitive to pressure reduction, i.e., a magnetic head slider whose disk-to-head clearance is not changed too significantly by changes in pressure. Recently, notebook-type personal computers and other hand-held information-processing units having a mounted HDD have proliferated and these products are required to be usable at high altitudes such as in an airplane. Devices capable of maintaining a stable disk-to-head clearance, even under those low-pressure conditions, are being called for partly because the disk-to-head clearance (the distance between the disk and the magnetic head slider) decreases under low pressure and because the disk-to-head clearance is decreasing year after year.

In current HDDs, the clearance of the slider with respect to the disk is reduced below, for example, less than 10 nm by the increase in recording density. Since the recording surfaces of all disks are uneven, the distances (clearances) of the disk from the magnetic head slider, at specific locations on the disk, amount to several nanometers, even under normal pressure. To implement servo track writing under low pressure, therefore, it is preferable that any changes in the disk-to-head clearance under low pressure should be less than about 10% of the disk-to-head clearance under normal pressure. More specifically, for a magnetic head slider preadjusted for a disk-to-head clearance of, for example, about 10 nm, changes in the disk-to-head clearance are, preferably, less than 1 nm, and further preferably, about 0.5 nm or less. Thus, stable recording of servo data is possible, even under low pressure. Conversely, the characteristics that increase the disk-to-head clearance with decreases in pressure can also be provided for a specific shape of the air-bearing surface. In this case, it is necessary that the disk-to-head clearance be controlled below a required value to enable the magnetic head slider to perform servo data read/write operations on the disk. In other words, it is preferable that any increases in the servo track write disk-to-head clearance under a depressurized state should be about 10% or less of the disk-to-head clearance under normal pressure. For a magnetic head slider preadjusted for a disk-to-head clearance of about 10 nm, increases in the disk-to-head clearance under a depressurized state are, preferably, 2 nm or less, and further preferably, about 1 nm or less.

The clearance of the magnetic head slider from the disk can be maintained to a certain degree, even under reduced pressure, by appropriately designing the air-bearing surface of the magnetic head slider. One such example of a usable magnetic head slider whose disk-to-head clearance does not change too substantially with respect to changes in pressure is a magnetic head slider having an air-bearing surface (ABS) structure in which is formed the two-level pressure-increasing stepped surface described later. The two-level pressure-increasing stepped surface generates a high positive pressure, whereby, even under a very low atmospheric pressure of about 0.4, the disk-to-head clearance can be maintained and servo track writing is possible.

Figure 5:
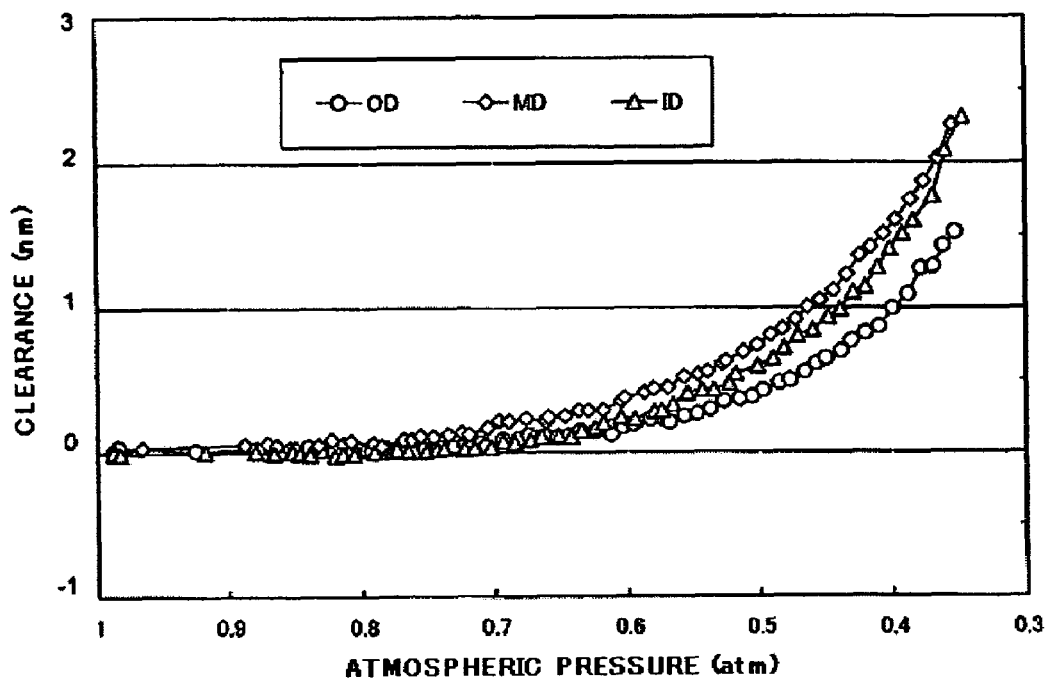
FIG. 5 is a graph representing a disk-to-head clearance-atmospheric pressure relationship of a magnetic head slider suitable in the above embodiment of the present invention.
Figure 6:
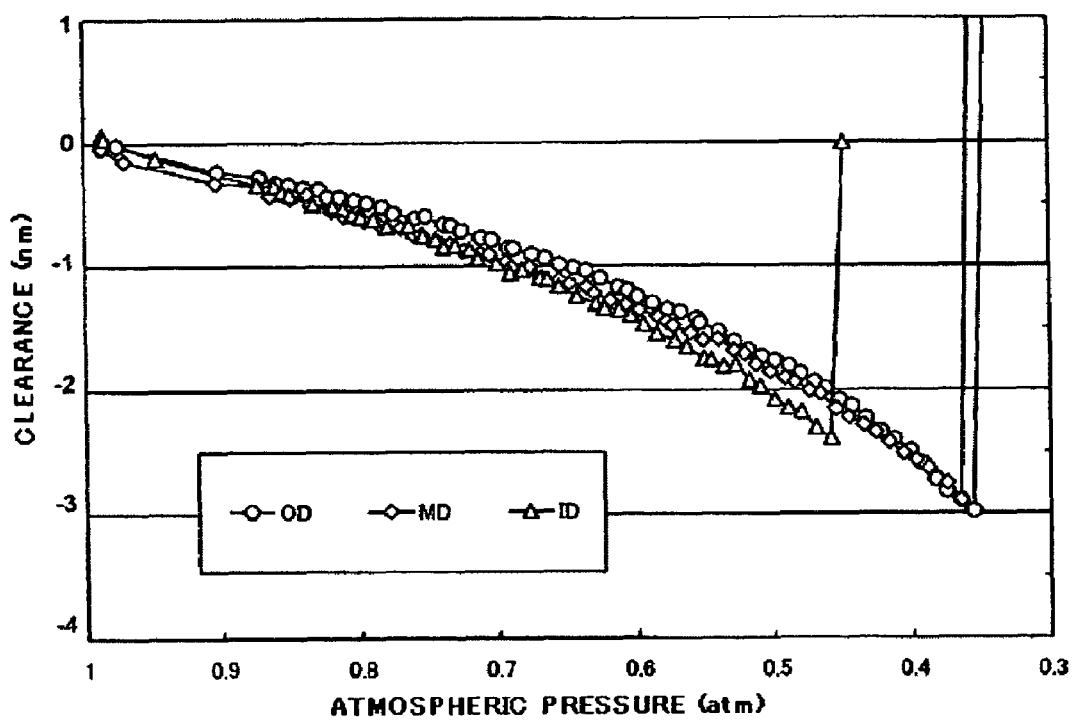
FIG. 6 is a graph representing a disk-to-head clearance-atmospheric pressure relationship of a conventional magnetic head slider.

Next, description is given of a magnetic head slider suitable for maintaining a stable disk-to-head clearance even under reduced pressure as in the present embodiment. FIG. 5 is a graph representing a disk-to-head clearance-atmospheric pressure relationship of a magnetic head slider suitable in the present embodiment. This magnetic head slider has an air-bearing surface including a two-level pressure-increasing stepped surface formed thereon. A graph representing the relationship between the disk-to-head clearance of a conventional magnetic head slider and atmospheric pressure is shown in FIG. 6 for comparison. FIGS. 5 and 6 both show measurement results on clearances between respective recording surfaces of a double-sided recording disk and a head (magnetic head slider) for recording data on the recording surfaces. Both types of disks were measured at inner-circumferential, intermediate, and outer-circumferential sections of the disk. Each of the disk-to-head clearances is a distance from a protective film surface of the disk to an air-bearing surface of the magnetic head slider, and includes a thickness (about 1 nm) of the lubricating layer formed on the protective film.

In both cases, although an HDD preadjusted for a disk-to-head clearance of 9 nm was used for the measurements, actual disk-to-head clearances are as shown in FIG. 6. That is to say, the disk surface is uneven and when a distance (clearance) from the highest position on the disk to the closest position of the magnetic head slider with respect to the disk is taken as a reference value of 0, one magnetic head slider comes into contact in the neighborhood of an atmospheric pressure of about 0.5 (equivalent to an altitude of 20,000 ft, or 6,096 m). Servo track writing will be impossible if such contact occurs even in one place.

In contrast to this, as shown in FIG. 5, in the HDD with the magnetic head slider of the present invention that has an air-bearing surface including a two-level pressure-increasing stepped surface formed thereon, the disk-to-head clearance at an atmospheric pressure of about 0.37 (equivalent to an altitude of 25,000 ft, or 7,620 m) increases by about 1 nm with respect to the value obtained under normal pressure. This indicates that although the disk-to-head clearance slightly increases, since the slider has the characteristics that the disk-to-head clearance increases with decreases in atmospheric pressure, contact does not occur, even when pressure is reduced.

Next, such a magnetic head slider with an air-bearing surface including a two-level pressure-increasing stepped surface formed thereon is described in further detail below. The magnetic head slider described below is an example of a magnetic head slider not changing too significantly in disk-to-head clearance with respect to changes in pressure, and capable of conducting stable read/write operations even under reduced pressure. Therefore, this slider needs only to be capable of performing data read/write operations on a disk without coming into contact therewith under a desired pressure, and the present invention is not limited to/by the following description.

Figure 7:
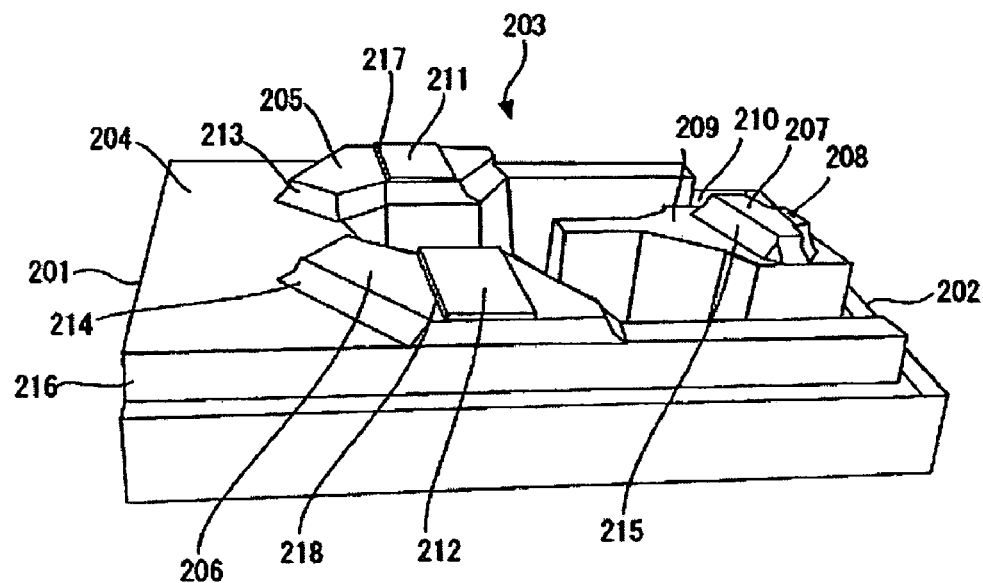
FIG. 7 is a perspective view of a magnetic head slider according to a first example in the present invention.
Figure 8:
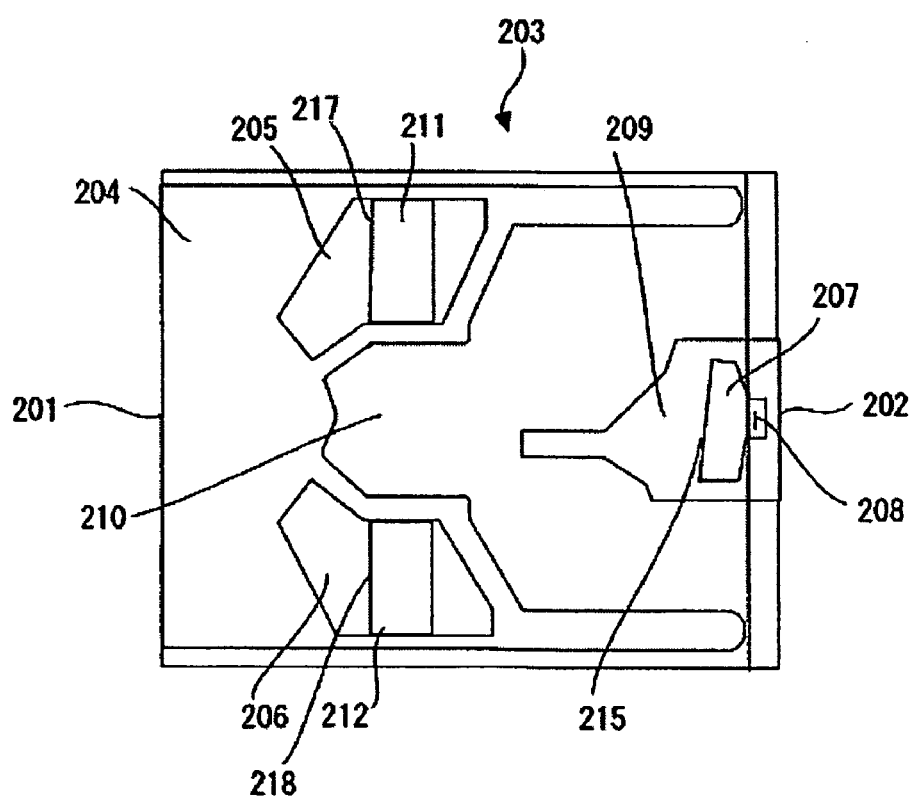
FIG. 8 is a plan view of the slider of FIG. 7.
Figure 9:
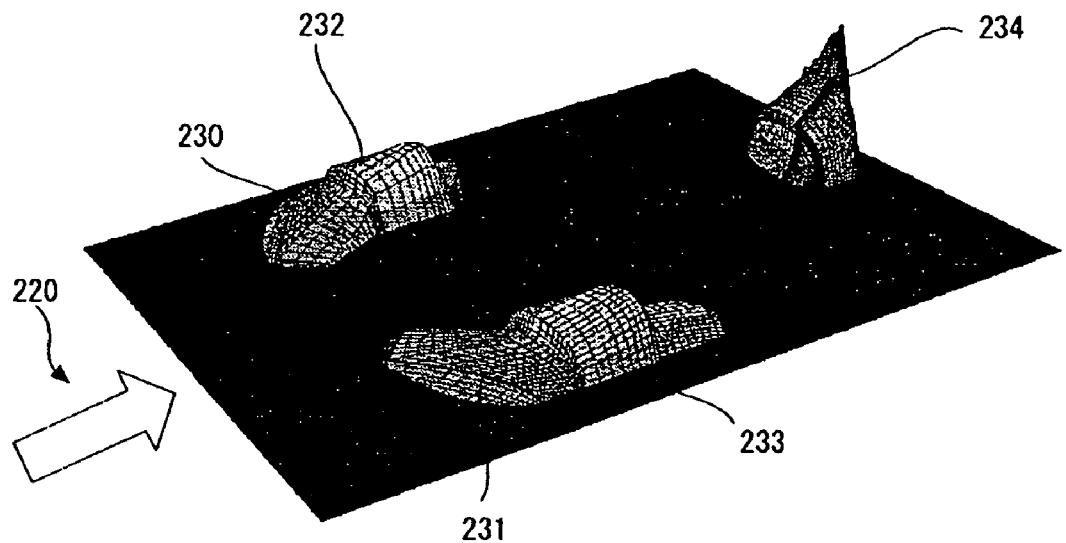
FIG. 9 is a pressure distribution diagram of the slider.

FIG. 7 is a perspective view of a magnetic head slider according to a first example in the present invention, FIG. 8 is a plan view of the slider of FIG. 7, and FIG. 9 is a pressure distribution diagram of the slider. As shown in FIGS. 7 and 8, the magnetic head slider according to the first example in the present invention includes a leading edge 201, a trailing edge 202, and an air-bearing surface 203. The air-bearing surface 203 has: a leading side air-bearing surface 204; leading rail surfaces 205 and 206 each formed with a first shoulder 213 or 214, respectively, on the leading side air-bearing surface 204; a trailing side air-bearing surface 209; a trailing rail surface 207 having a magnetic head (magnetic head transducer) and further formed with a first shoulder 215 on the trailing side air-bearing surface 209; a negative-pressure groove 210; and stepped upper surfaces 211 and 212 each formed with a second shoulder 217 or 218 on the leading rail surfaces 205 and 206, respectively.

The leading rail surfaces 205, 206 and the trailing rail surface 207 are present in substantially the same plane, and each acts as the so-called positive-pressure rail surface that generates a pressure using an inflow of an airflow 220 between the slider and the magnetic disk and causes the slider to fly above the disk.

The leading side air-bearing surface 204 and the trailing side air-bearing surface 209 are present in substantially the same plane, and depths from the leading rail surfaces 205, 206 and from the trailing rail surface 207 are about 200 nm. The airflow 220, after flowing in between the slider and the magnetic disk surface from the leading edge 201, is increased in pressure at the first shoulders 213, 214, 215 via the leading side air-bearing surface 204 and the trailing side air-bearing surface 209. Next, the airflow 220 arrives at the leading rail surfaces 205, 206 and the trailing rail surface 207.

After arriving at the leading rail surfaces 205, 206, the airflow 220 further flows along the second shoulders 217, 218 and reaches the stepped upper surfaces 211, 212, at which the airflow 220 then generates a pressure large enough to cause the slider to fly. To generate large enough a pressure at the stepped upper surfaces 211, 212, these stepped surfaces need to have a certain degree of continuous length in an inflow direction of the airflow 220, namely, in a longitudinal direction of the slider. Large lifting force can be obtained by forming such low second shoulders.

One of the greatest features of this example exists in that the stepped upper surfaces 211, 212, each having a continuous length of space, are provided on the leading rail surfaces 205, 206. Constructing the slider in this way causes the airflow 220, after being increased in pressure at the first shoulder 213, 214, first to generate a slider-lifting pressure 230, 231 (see FIG. 9) at the leading rail surface 205, 206, then to be further increased in pressure at the second shoulder 217, 218, and to generate a large pressure 232, 233 at the stepped upper surface 211, 212. Meanwhile, the airflow that has flown in from the trailing side air-bearing surface 209 is increased in pressure at the first shoulder 215 and generates a pressure 234 at the trailing rail surface 207.

It is preferable that the stepped upper surfaces 211, 212 should have at least a required length in the longitudinal direction of the slider in order to generate a large positive pressure. Maximum length of the stepped upper surfaces 211, 212, however, needs to be controlled below a length of the leading rail surface 205, 206 in order to form the second shoulders 217, 218. Large lifting force can be obtained by providing such a two-level pressure-increasing stepped section. Thus, it becomes possible to downsize the leading rail surfaces 205, 206 and trailing rail surface 207 that are required for achieving a required disk-to-head clearance.

The leading and trailing rail surfaces for generating pressures are so-called positive-pressure rail surfaces, and since the present invention can reduce the rail surface areas needed to obtain the required disk-to-head clearance, it is possible to reduce decrements in the disk-to-head clearance under low pressure.

In general, as the slider decreases in area, the negative-pressure groove 210 also decreases in area. A level of the negative pressure that the slider can generate, therefore, decreases and a decrease in the disk-to-head clearance under reduced pressure is augmented. Additionally, the tendency towards further reduction in the diameters of magnetic disks by accelerated downsizing of magnetic disk drives in recent years is becoming one causative factor in augmenting a decrease in the disk-to-head clearance under low pressure such as in high altitudes. Adopting the construction according to the present example, however, makes it possible to reduce the slider rail areas required for achieving a required disk-to-head clearance, and thus to reduce decreases in the disk-to-head clearance under reduced pressure.

When it flies above the disk by means of the airflow 220, the slider takes a flying position/attitude at which the disk-to-head clearance at the leading edge 201 increases above that of the trailing edge 202. The disk-to-head clearance at a terminating portion of the trailing rail surface 207 having the magnetic head 208, therefore, becomes the smallest in the present example. When the stepped upper surfaces 211, 212 are formed as in the present example, if the disk-to-head clearances at terminating portions of the stepped upper surfaces 211 and 212 decrease below the disk-to-head clearance of the trailing rail surface 207, the stepped upper surfaces 211, 212 are likely to touch the disk. To prevent this and to ensure the disk-to-head clearance that does not bring the head to come into contact with the disk under the depressurized state required during servo track writing, it is necessary that a shape of the air-bearing surface 203, inclusive of heights and sizes of the stepped upper surfaces 211, 212, should be appropriately determined considering the flying position/attitude of the slider.

Figure 10:
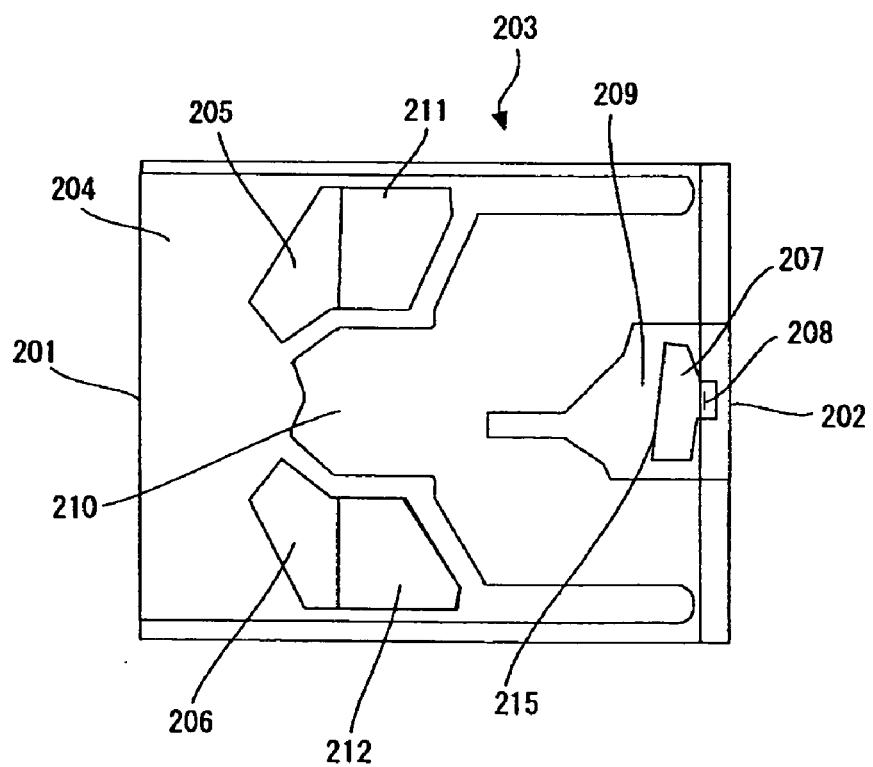
FIG. 10 is a plan view showing a magnetic head slider according to a second example in the present invention.

FIG. 10 is a plan view showing a second example of a magnetic head slider. In the present example, since terminating portions of stepped upper surfaces 211, 212 extend to those of leading rail surfaces 205, 206 and thus since continuity of these stepped surfaces is increased, it is possible to form pressures greater than those obtained for the slider in the first example. Constructing the slider in the second example as described above produces a greater prevention effect against decreases in the disk-to-head clearance under low pressure.

Figure 11:
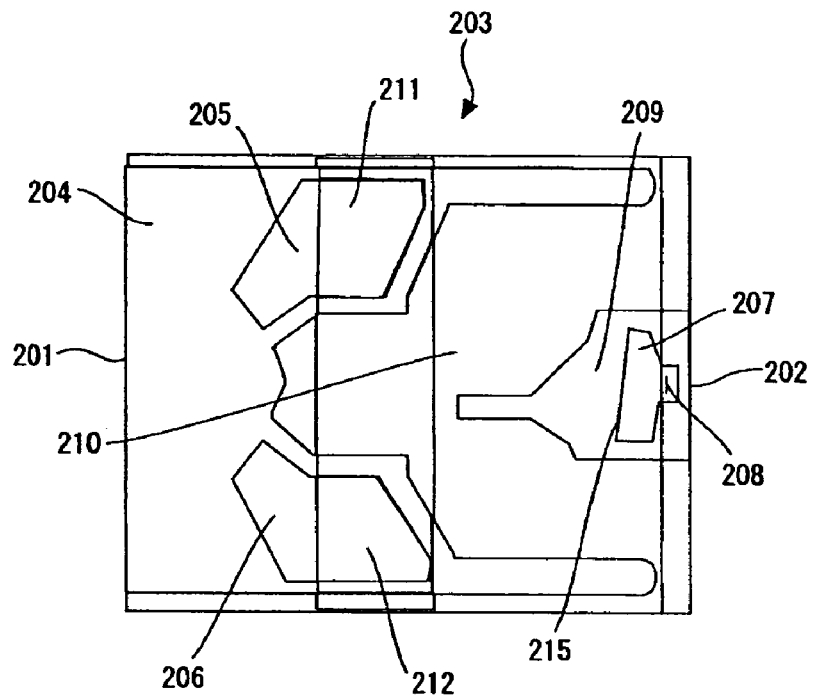
FIG. 11 is a plan view showing a magnetic head slider according to a third example in the present invention.

FIG. 11 is a plan view showing a third example of a magnetic head slider. In the present example, masks for forming stepped upper surfaces 211, 212 are formed into a shape not only to extend to the tops of leading rail surfaces 205, 206, but also to traverse the slider in its lateral direction. It becomes possible, by constructing the slider in this form, to process the slider without having to pay careful attention to position-matching accuracy of the masks.

Figure 12:
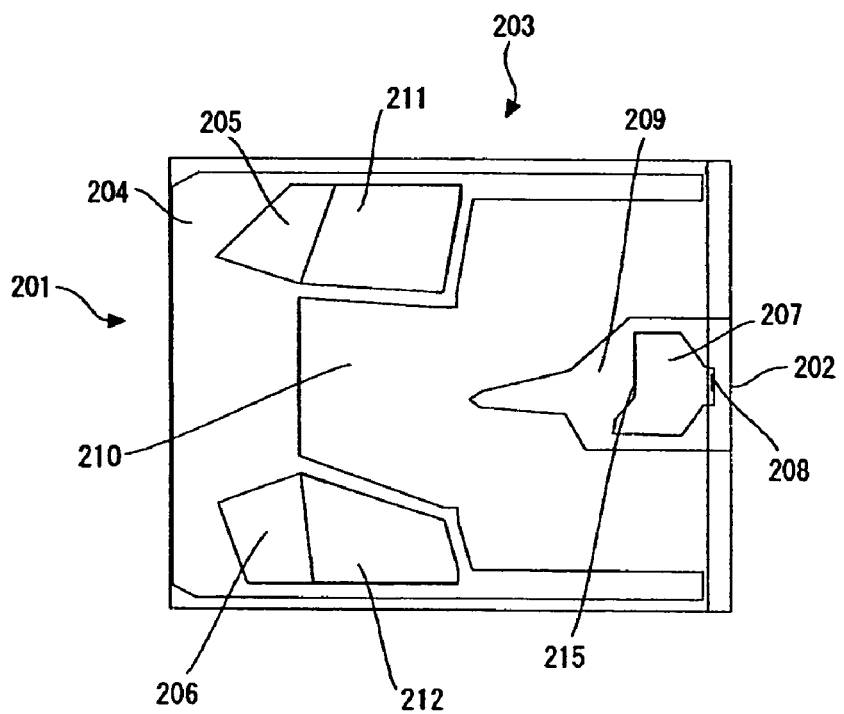
FIG. 12 is a plan view showing a magnetic head slider according to a fourth example in the present invention.

FIG. 12 is a plan view showing a fourth example of a magnetic head slider. In the present example, leading rail surfaces 205, 206 and stepped upper surfaces 211, 212 are even longer than those of any other example. Accordingly, in addition to reducing any decreases in the disk-to-head clearance under low pressure, reducing any changes in the disk-to-head clearance due to errors in pitch attitude angle of a suspension is possible since rigidity of an air film in a pitching direction increases.

It is possible, by appropriately adjusting a design for the air-bearing surface of any such magnetic head slider (as described above) in terms of, for example, the areas and heights of the stepped upper surfaces 211, 212 with respect to those of the leading rail surfaces 205, 206, to obtain a magnetic head slider that can stably fly without causing head-to-disk contact even under a low atmospheric pressure of about 0.4. Using this magnetic head slider to conduct servo track writing operations under reduced pressure makes very highly accurate recording of servo data possible and a highly reliable HDD obtainable.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A manufacturing method for a disk drive, comprising:
storing, into an enclosure, a disk, a magnetic head slider with a magnetic head for writing data onto and reading out data from the disk, a suspension for retaining the magnetic head slider, an arm for supporting the suspension, and a driving section for driving the arm;
depressurizing the inside of the enclosure to an atmospheric pressure lower than normal atmospheric pressure; and
recording servo data on the disk.

2. The manufacturing method for a disk drive according to claim 1, wherein the inside of the enclosure is depressurized to an atmospheric pressure lower than normal atmospheric pressure, by housing the enclosure in a chamber pre-depressurized to an atmospheric pressure lower than normal atmospheric pressure.

3. The manufacturing method for a disk drive according to claim 1, wherein the inside of the enclosure is depressurized to an atmospheric pressure lower than normal atmospheric pressure, by suctioning an internal gas from a particle test hole provided in the enclosure.

4. The manufacturing method for a disk drive according to claim 1, wherein self-servo track writing is used to record servo data on the disk.

5. The manufacturing method for a disk drive according to claim 1, wherein the magnetic head slider has an air-bearing surface comprising:
   a leading side air-bearing surface formed in a longitudinal direction of the slider from a leading edge;
   a first stepped surface formed on the leading side air-bearing surface, the first stepped surface having a first shoulder with respect to the leading side air-bearing surface; and
   a second stepped surface formed on the first stepped surface, the second stepped surface having a second shoulder with respect to the first stepped surface;
   wherein the magnetic head slider operates to record servo data on the disk.

6. The manufacturing method for a disk drive according to claim 1, wherein the magnetic head slider has an air-bearing surface comprising:
   one or plural leading rail surfaces;
   a trailing rail surface with approximately the same height as the height of each of the leading rail surfaces, the trailing rail surface having the magnetic head provided thereon;
   a leading side air-bearing surface having a required depth of D1 with respect to each leading rail surface and to the trailing rail surface;
   a negative-pressure grooved surface with an even greater depth of D2 with respect to the leading side air-bearing surface; and
   a stepped upper surface having continuity in a direction from the leading edge toward a trailing edge, the stepped upper surface being formed in a region including at least one portion of each of the leading rail surfaces, with a required height above each thereof;
   wherein said leading side air-bearing surface and each of said leading rail surfaces are formed between said leading edge and said stepped upper surface; and
   wherein the magnetic head slider operates to record servo data on the disk.

7. A servo track writer comprising:
   a magnetic head slider with a magnetic head for recording servo data on a disk;
   a suspension configured to retain said magnetic head slider;
   an arm configured to support said suspension; and
   a driving section configured to drive said arm;
   wherein said magnetic head slider is constructed so that a difference between a slider-to-disk clearance under a state depressurized to a required pressure lower than normal atmospheric pressure, and a slider-to-disk clearance under normal atmospheric pressure, is equal to or less than about 10% of the slider-to-disk clearance under normal atmospheric pressure.

8. The servo track writer according to claim 7, wherein said magnetic head slider is constructed so that a maximum slider-to-disk clearance under the state depressurized to the required pressure is about 0.5 nm smaller than the slider-to-disk clearance under normal atmospheric pressure.

9. The servo track writer according to claim 7, wherein said magnetic head slider has an air-bearing surface comprising:
   a leading side air-bearing surface formed in a longitudinal direction of the slider from a leading edge;
   a first stepped surface formed on the leading side air-bearing surface, the first stepped surface having a first shoulder with respect to the leading side air-bearing surface; and
   a second stepped surface formed on the first stepped surface, the second stepped surface having a second shoulder with respect to the first stepped surface.

10. The servo track writer according to claim 7, wherein said magnetic head slider has an air-bearing surface comprising:
    one or plural leading rail surfaces;
    a trailing rail surface with approximately the same height as the height of each of the leading rail surfaces, the trailing rail surface having the magnetic head provided thereon;
    a leading side air-bearing surface having a required depth of D1 with respect to each leading rail surface and to the trailing rail surface;
    a negative-pressure grooved surface with an even greater depth of D2 with respect to the leading side air-bearing surface; and
    a stepped upper surface having continuity in a direction from the leading edge toward a trailing edge, the stepped upper surface being formed in a region including at least one portion of each of the leading rail surfaces, with a required height above each thereof;
    wherein said leading side air-bearing surface and each of said leading rail surfaces are formed between said leading edge and said stepped upper surface.

11. A magnetic disk drive, comprising:
    a disk;
    a magnetic head slider with a magnetic head for recording servo data on said disk;
    a suspension configured to retain said magnetic head slider;
    an arm configured to support said suspension; and
    a driving section configured to drive said arm;
    wherein said magnetic head slider is constructed so that a difference between a slider-to-disk clearance during self-servo track writing under a state depressurized to a required pressure lower than normal atmospheric pressure, and a slider-to-disk clearance under normal atmospheric pressure, is equal to or less than about 10% of the slider-to-disk clearance under normal atmospheric pressure.

12. The servo track writer according to claim 11, wherein said magnetic head slider is constructed so that a maximum slider-to-disk clearance under the state depressurized to the required pressure is about 0.5 nm smaller than the slider-to-disk clearance under normal atmospheric pressure.

13. The servo track writer according to claim 11, wherein said magnetic head slider has an air-bearing surface comprising:
    a leading side air-bearing surface formed in a longitudinal direction of the slider from a leading edge;

a first stepped surface formed on the leading side air-bearing surface, the first stepped surface having a first shoulder with respect to the leading side air-bearing surface; and a second stepped surface formed on the first stepped surface, the second stepped surface having a second shoulder with respect to the first stepped surface.

14. The servo track writer according to claim 11, wherein said magnetic head slider has an air-bearing surface comprising:

one or plural leading rail surfaces;

a trailing rail surface with approximately the same height as the height of each of the leading rail surfaces, the trailing rail surface having the magnetic head provided thereon;

a leading side air-bearing surface having a required depth of D1 with respect to each leading rail surface and to the trailing rail surface;

a negative-pressure grooved surface with an even greater depth of D2 with respect to the leading side air-bearing surface; and a stepped upper surface having continuity in a direction from the leading edge toward a trailing edge, the stepped upper surface being formed in a region including at least one portion of each of the leading rail surfaces, with a required height above each thereof;

wherein said leading side air-bearing surface and each of said leading rail surfaces are formed between said leading edge and said stepped upper surface.

* * * * *